US008996888B2

(12) United States Patent
Nemazie et al.

(10) Patent No.: US 8,996,888 B2
(45) Date of Patent: Mar. 31, 2015

(54) MOBILE DEVICE USING SECURE SPIN TORQUE TRANSFER MAGNETIC RANDOM ACCESS MEMORY (STTMRAM)

(71) Applicant: Avalanche Technology, Inc., Fremont, CA (US)

(72) Inventors: Siamack Nemazie, Los Altos Hills, CA (US); Ngon Van Le, Fremont, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

(21) Appl. No.: 13/630,731

(22) Filed: Sep. 28, 2012

(65) Prior Publication Data

US 2014/0082374 A1    Mar. 20, 2014

Related U.S. Application Data

(63) Continuation-in-part of application No. 13/619,114, filed on Sep. 14, 2012.

(51) Int. Cl.
*G06F 11/30* (2006.01)
*G06F 21/10* (2013.01)

(52) U.S. Cl.
CPC ........ *G06F 21/10* (2013.01); *G06F 2221/2107* (2013.01)
USPC ............................ 713/193; 455/410; 455/573

(58) Field of Classification Search
CPC . G06F 21/10; G06F 2221/2107; G06F 21/00; G06F 21/60; G06F 21/78; G06F 3/0679; G06F 11/1068; G06F 2212/2022; G06F 3/062; G06F 9/30101; G11B 20/00086; G11B 20/0021; H04L 9/08
See application file for complete search history.

(56) References Cited

U.S. PATENT DOCUMENTS

| | | | | |
|---|---|---|---|---|
| 7,895,406 B2* | 2/2011 | Nagao | ............................ | 711/164 |
| 7,944,738 B2* | 5/2011 | Liu et al. | ........................ | 365/158 |
| 2003/0140238 A1* | 7/2003 | Turkboylari | ................... | 713/193 |
| 2006/0077768 A1* | 4/2006 | Tanimura | .................... | 369/30.01 |
| 2007/0157029 A1* | 7/2007 | Mani | .............................. | 713/183 |
| 2010/0173627 A1* | 7/2010 | Gustafson et al. | .......... | 455/426.1 |
| 2011/0125963 A1* | 5/2011 | Sun | ................................ | 711/114 |
| 2012/0071215 A1* | 3/2012 | Bourque et al. | ............... | 455/573 |
| 2013/0159733 A1* | 6/2013 | Lee et al. | ....................... | 713/193 |
| 2013/0267199 A1* | 10/2013 | Kamal et al. | ................... | 455/410 |

* cited by examiner

*Primary Examiner* — Ali Abyaneh
*Assistant Examiner* — Gregory M Elmore
(74) *Attorney, Agent, or Firm* — Maryam Imam; IPxLAW Group LLP (57) ABSTRACT

A mobile device includes an application processor, an RF modem for connection to cellular networks, wireless device for connection to wireless networks, a display coupled to the application processor, audio devices coupled to the application processor, power management for providing power through a main battery; and charging the battery, a hybrid memory including a magnetic memory, the magnetic memory further including a parameter area configured to store parameters used to authenticate access to certain areas of the main memory, and a parameter memory that maintains a first area, used to store protected zone parameters, and a second area used to store authentication parameters, the protection zone parameters and the authentication parameters being associated with access to the certain areas in the main memory that requires authentication. Upon modification of any of the parameters stored in the parameter memory by a user, a corresponding location of the parameter area of the main memory is also modified.

35 Claims, 6 Drawing Sheets

MOBILE DEVICE USING SECURE SPIN TORQUE TRANSFER MAGNETIC RANDOM ACCESS MEMORY (STTMRAM)

CROSS REFERENCE TO RELATED APPLICATIONS

This application is a continuation-in-part of our U.S. patent application Ser. No. 13/619,114, filed on Sep. 14, 2012, by Nemazie et al., and entitled "SECURE SPIN TORQUE TRANSFER MAGNETIC RANDOM ACCESS MEMORY (STTMRAM)", the disclosure of which is incorporated herein by reference as though set forth in full.

BACKGROUND OF THE INVENTION

1. Field of the Invention

The invention relates generally to a secure spin torque transfer magnetic random access memory (STTMRAM) and particularly to STTMRAM with protected areas and use thereof.

2. Description of the Prior Art

Microprocessor-based systems commonly employ volatile random access memory such as static random access memory (SRAM) or dynamic random access memory (DRAM), and non-volatile random access memory such as NOR Flash. They also use non-volatile block access memory such as NAND Flash for mass storage applications. Use of volatile random access memory includes dynamic storage of programs and data. Flash has typically much slower access time than RAM but offers non-volatility. The non-volatile random access memory NOR Flash use includes storing code (including BIOS, pre boot or boot code), and system configuration parameters, such code or parameters are changed very infrequently. If the code is altered in a malicious manner, it can be used to introduce viruses. Non-volatile random access memory, such as NOR Flash, includes features to enable or disable programming in an effort to prevent unauthorized programming of certain protected areas, such as those including sensitive or confidential information. However, currently, there is no fast, reliable, and secure manner for using the protected areas that are designated for information that requires authentication prior to accessing thereof.

Thus, there is a need for microprocessor-based systems using memory and protected areas to securely, reliably, and speedily access such protected areas.

SUMMARY OF THE INVENTION

Briefly, a mobile device is disclosed to include an application processor, an RF modem for connection to cellular networks, wireless device for connection to wireless networks, a display coupled to the application processor, audio devices coupled to the application processor, power management for providing power through a main battery; and charging the battery, a hybrid memory including a magnetic memory, the magnetic memory further including a parameter area configured to store parameters used to authenticate access to certain areas of the main memory, and a parameter memory that maintains a first area, used to store protected zone parameters, and a second area used to store authentication parameters, the protection zone parameters and the authentication parameters being associated with access to the certain areas in the main memory that requires authentication. Upon modification of any of the parameters stored in the parameter memory by a user, a corresponding location of the parameter area of the main memory is also modified.

These and other objects and advantages of the invention will no doubt become apparent to those skilled in the art after having read the following detailed description of the various embodiments illustrated in the several figures of the drawing.

DETAILED DESCRIPTION OF THE VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

In an embodiment of the invention, a magnetic memory device includes a main memory made of magnetic memory, the main memory and further includes a parameter area used to store parameters used to authenticate access. Further, the magnetic memory device has parameter memory that maintains a protected areas used to store protected zone parameters, and an authentication zone used to store authentication parameters, the protection zone parameters and the authentication parameters being associated with the access that requires authentication. Upon modification of any of the parameters stored in the parameter memory by a user, a corresponding location of the parameter area of the main memory is also modified.

In an exemplary embodiment, the main memory is made of Magnetic Random Access Memory (MRAM), such as Spin Torque Transfer Magnetic Random Access Memory (STTM-RAM), with an access time that is comparable with RAM as well as being non-volatile. Accordingly, the need for non-volatile random access memory such as NOR Flash in system applications is advantageously eliminated. Also, unauthorized write access to the protected zone (or area) is advantageously prevented thereby increasing the security features of the magnetic memory device. Additionally moving parameters, code and data from a relatively slow non-volatile memory such as NOR Flash to a relatively fast volatile RAM is avoided, thus increasing security, and performance of the system.

The main memory in the non-volatile memory SSTMRAM includes one or more protected zones. The protected zones can be dynamically configured to enable or disable write operations to the protected zone.

In one embodiment of the invention, the parameters associated with configuration of the magnetic memory device, and operation of memory including parameters associated with the protected zones (parameters) are stored in the main memory and during power up or when an initialization command is issued after power are read from main memory and loaded into volatile memory (latch, register, RAM) for control of memory operations. When the parameters are updated, both the main memory and corresponding volatile memory are updated.

In another embodiment, some parameters are updated including parameters associated with protected zones and they are password-protected, the password being part of parameters (authentication parameters).

In yet another embodiment, the password is encrypted with a session key, the session key being part of parameters (crypto parameters).

Figure 1:
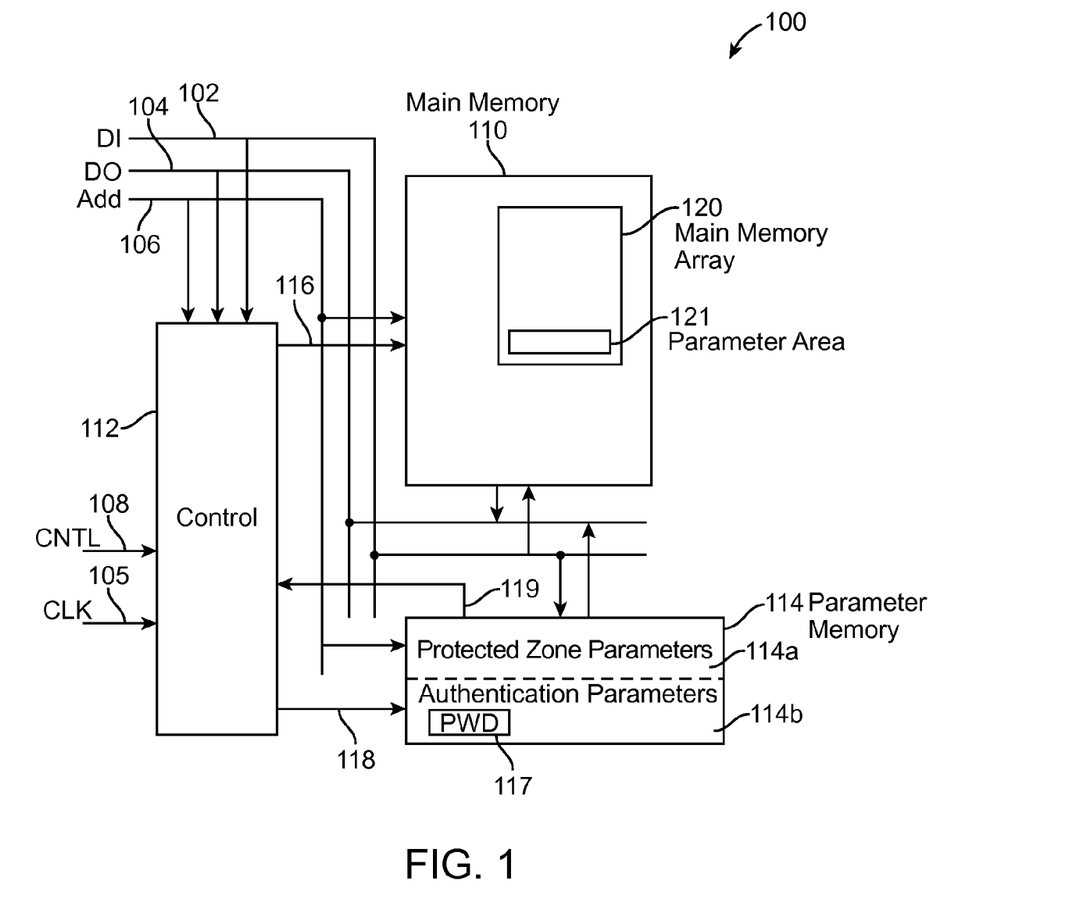
FIG. 1 shows a block diagram of one embodiment of the invention.

Referring now to FIG. 1, a block diagram of magnetic memory device 100, is shown, in accordance with an embodiment of the invention. The device 100 is shown to include a magnetic random access main memory 110, a parameter memory 114, and a control circuit 112. The main memory 110 is shown to include a main memory array 120 organized as an array of rows and columns of magnetic memory cells, rows making up one or more pages. The main memory array 120 is shown to include a parameter area 121. The main memory array 120 is a designated part of the main memory 110 and within the array 120 is the designated area, i.e. the parameter area 121.

The parameter memory 114 is shown to include protected zone parameters 114a and a authentication parameters 114b, the latter of which is shown to include a password 113. The parameters 114a and 114b each are areas of the parameters memory 114 collectively comprise a "protected area" within the parameters memory 114 that are associated with the access that requires authentication. As will be evident, the password 113 is a password or code that is stored in the parameter memory 114 for use in authenticating the access to the information stored in the parameter area 121. Thus, the parameter memory 114 maintains a protected area used to store protected zone parameters, and an authentication parameters area used to store authentication parameters, the protection zone parameters and the authentication parameters being associated with the access that requires authentication.

The control circuit 112 is shown to receive control signals ("CNTL") 108 and a clock ("CLK") 105. The control circuit 112 uses the CNTL 108 and the CLK 105 to direct accessing of the main memory 110 and the parameter memory 114 and is thus coupled to the main memory 110, through input data ("DI") 102, output data ("DO") 104, address bus ("Add"), and control signals 116, and is also coupled to the parameter memory 114 through the DI 102, the DO 104, the Add 106, parameters 119, and control signals 118.

The main memory 110 may be any kind of magnetic memory, such as but not limited to spin torque transfer magnetic random access memory (STTMRAM). In one embodiment, the parameter memory 114 is any kind of volatile memory such as a latch, register, register file, or SRAM.

The input to the memory device 100 interface includes a clock, CLK 105, an address bus Add 106, a data in bus DI 102, data out bus DO 104 and a control CNTL 108. Control CNTL 108 comprising of a chip enable; CE*108a, and a write enable; WE* 108b. All commands are defined by states of control signals CE* 108a, and WE* 108b at the rising edge of the clock CLK 105. In this embodiment the memory device 100 is a synchronous memory with separate input and output buses other embodiments with asynchronous memory, synchronous double data rate (DDR) and/or with common input/output bus fall within scope of the invention.

In this embodiment the parameters associated configuration, and operation of memory including parameters associated with the protected zones and authentication are stored in the main memory array 120 in a parameter area 121 and are read from parameter area 121 in main memory 110 during power up or when an initialization command is issued after power up and loaded into parameter memory 114. In this embodiment a parameter in parameter memory 114 has a corresponding one in parameter area 121. If a parameter in parameter memory 114 is updated by the user the corresponding location in parameter area 121 is also updated.

In an alternative embodiment the parameter memory 114 is a hybrid and consists of a volatile memory for protected zone parameters 114a and a non-volatile memory for authentication parameters where the non-volatile parameter memory is made with same magnetic memory cell as the main memory 110. In this alternative embodiment a parameter in volatile parameter memory have a corresponding one in the non-volatile parameter area 121, and during power up or when an initialization command is issued after power are read from non-volatile parameter area and loaded into volatile parameter memory. If a parameter in volatile parameter memory is updated by the user the corresponding location in non-volatile parameter memory is also updated.

The address bus ("Add") 106 is shown coupled to the control circuit 112, the main memory 110, and the parameter memory 114, and provide an address identifying a location in the main memory 110 and or parameter memory 114 to which a write or a read operation is performed.

The control circuit 112 is shown to receive address bus 106, data in bus DI 102, the clock CLK 105 and CNTL 108. The control circuit 110 is also shown to receive parameters 119 from parameter memory 114, and to generate control signals 116 to main memory 110 and control signals 118 to parameter memory 114 for controlling operations. The parameters 119 is used to identify if the addressed data is in a protected zone and provide authentication parameters.

The data in bus DI 102 is shown coupled to both main memory 110 and parameter memory 114. The data out bus DO 104 is also coupled to both main memory 110 and parameter memory 114.

Figure 2A:
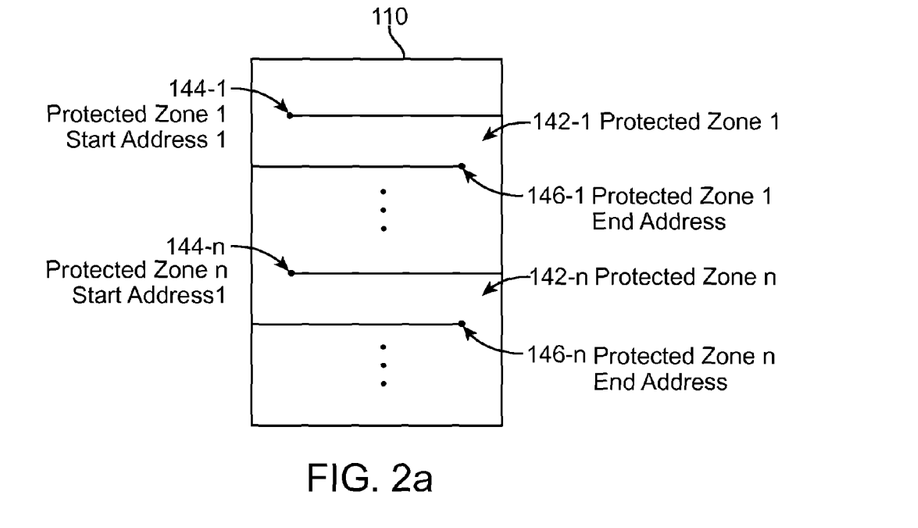
FIG. 2a shows a configuration of the main memory 110, in accordance with another embodiment of the invention for defining the protected zones.

The main memory 110 includes one more protected zones. FIG. 2a shows a configuration of the main memory 110, in accordance with an embodiment of the invention for defining the protected zones. In FIG. 2a the main memory 110 is shown to include n protected zone. Each protected zone is a contiguous address space from a start address to an end address. The start and end address are burst aligned (aligned to an address that is divisible by burst size). Protected zone 1 142-1 is the contiguous address space between protected zone 1 start address 144-1 and protected zone 1 end address 146-1. Protected zone n 142-n is the contiguous address space between protected zone n start address 144-n and protected zone 'n' end address 146-n, with 'n' being an integer value. The corresponding protected zone start address and end address are stored in parameter memory.

Figure 2B:
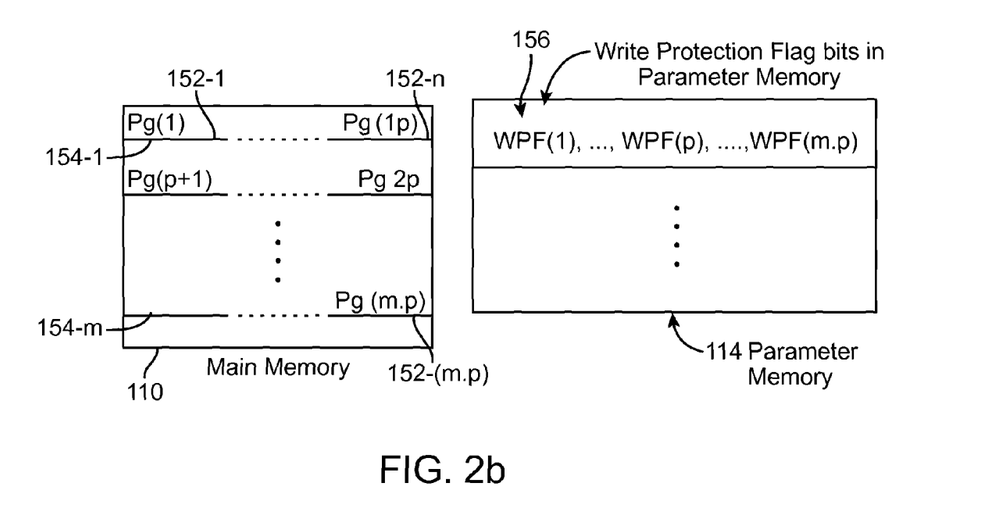
FIG. 2b shows a configuration of the main memory 110 and the parameter memory 114, in accordance with another embodiment of the invention for defining protected zones.

FIG. 2b shows a configuration of the main memory 110 and the parameter memory 114, in accordance with another embodiment of the invention for defining protected zones. The memory unit 110 is shown to include m rows 154-1 through 154-m, and each row comprising p pages for a total of t (t=m.p) pages, each page being a protected zone. A write protection Flag bit associated with each page in parameter memory is used to write protect the protected page.

In another embodiment the protected zone includes a plurality of pages, and the flag corresponds to the group. For example protected zone 1 consisted of page 1 and 2, protected zone 2 consists of pages 3 and 4 and so forth.

Figure 3A:
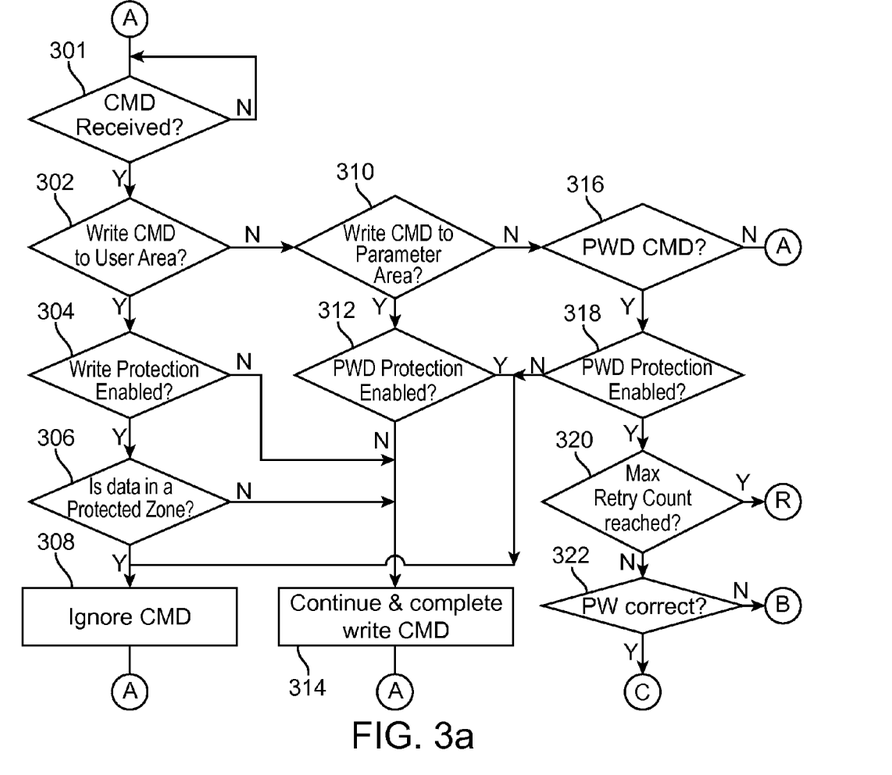
FIGS. 3a, 3b, 3c show a flow chart of the steps performed during a write operation to the main memory 110, in accordance with a method of the invention.
Figure 3B:
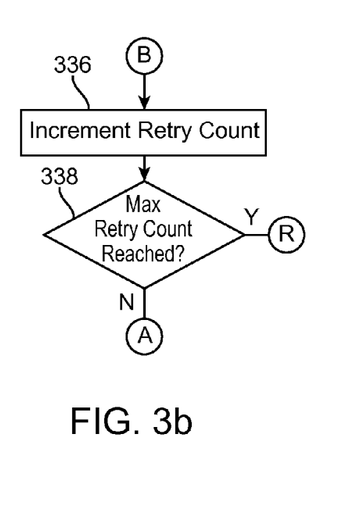
Figure 3C:
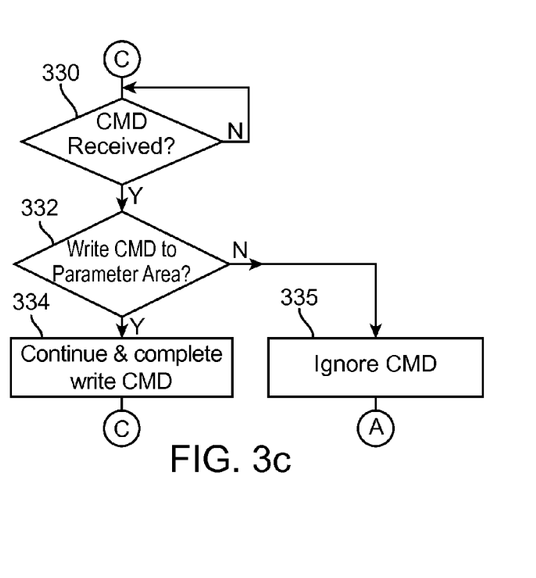

The write operation of memory of present invention will be described using the flow diagram of FIGS. 3a, 3b, and 3c.

At step 301 check for command (CMD) reception, and remain in step 301 until a CMD is received. When at step 301a command is received the process moves to step 302 and at step 302 checks if the CMD is a write to the user area. If at step 302 the CMD is a write to user area the process moves to step 304 and checks if write protection (a parameter) is enabled. If at step 304 it is determined that write protection is not enabled, the process moves to step 314 and completes the write command. If at step 304 it is determined that write protection is enabled the process moves to step 306. At step 306 the process checks to this if the address (or addresses in case of a burst) of the data to be written is in a protected zone. If at step 306 it is determined that the write is to a protected area the process moves to step 308 where the CMD is ignored (command completed without write) and the moves back to step 301. If at step 306 it is determined that the address of data to be written is not in a protected zone then the process moves to step 314 and completes the write command. If at step 302 it is determined that the write command is not to the user area the process moves to step 310. At step 310 the process checks if the CMD is a write to the parameter area. If at step 310 it is determined that the CMD is a write to parameter area the process moves to step 312 and checks if password (PWD) protection (a parameter in parameter memory) is enabled. If at step 312 it is determined that PWD protection is not enabled, the process moves to step 314 and completes the write command, else the process moves to step 308 and ignores the CMD is ignored. If at step 310 it is determined that the CMD is not a write to parameter area the process moves to step 316 and checks if the command is a PWD CMD. If at step 316 it is determined that the CMD is a PWD command the process moves to step 318 and checks if password (PWD) protection (a parameter in parameter memory) is enabled. If at step 318 it is determined that PWD protection is not enabled, the process moves to step 314 and completes the write command, else the process moves to step 320. At step 320 the process checks if the maximum number of retries for providing correct password is exceeded. If the maximum number of retries is not exceeded the process moves to step 322 and checks if the password provided with the PWD CMD is correct.

If at step 322 it is determined that the password provided along with PWD CMD is correct the process moves to step 330 else the process moves to step 336. At step 330 the process waits for a new command. When a new command is received the process moves to step 332 and checks if the new CMD is a write to the parameter area. If at step 332 it is determined that the CMD is a write to parameter area the process moves to step 334 and completes the write command and writes data in both the parameter memory and parameter area of the main memory, and then moves to step 330. If at step 332 it is determined that the CMD is not a write to parameter area the process moves to step 335 where the CMD is ignored (command completed without write) and the process moves back to step 301. If at step 322 it is determined that the password provided along with PWD command is incorrect, the process moves step 336 and increments the retry count and saves the retry count in parameter memory and parameter area of the main memory, and moves to step 338. At step 338 the process checks if the maximum number of retries for providing correct password is exceeded. If the maximum number of retries is not exceeded the process moves back to step 301 else move to step R for recovery. In one embodiment at step R the command is ignored and the process moves back to step 301. Other embodiments for step R, the recovery, can be envisioned and generally are variations to the general scope of the present invention.

As mentioned before if a parameter in volatile parameter memory is updated by the user the corresponding location in parameter area 121 of main memory 110 (or in alternative embodiment in non-volatile parameter memory) is also updated.

In the embodiment 100, the password provided along with the PWD CMD to verify and authenticate the user and allow subsequent writes to parameter area, is in the clear and can be observed by monitoring the memory 100 interface. Similarly the Set PWD CMD is in clear and can be observed by monitoring the memory 100 interface. It is desirable to encrypt the PWD with a key, such as master key or a session key that is dynamic (collectively referred to as key).

Figure 4:
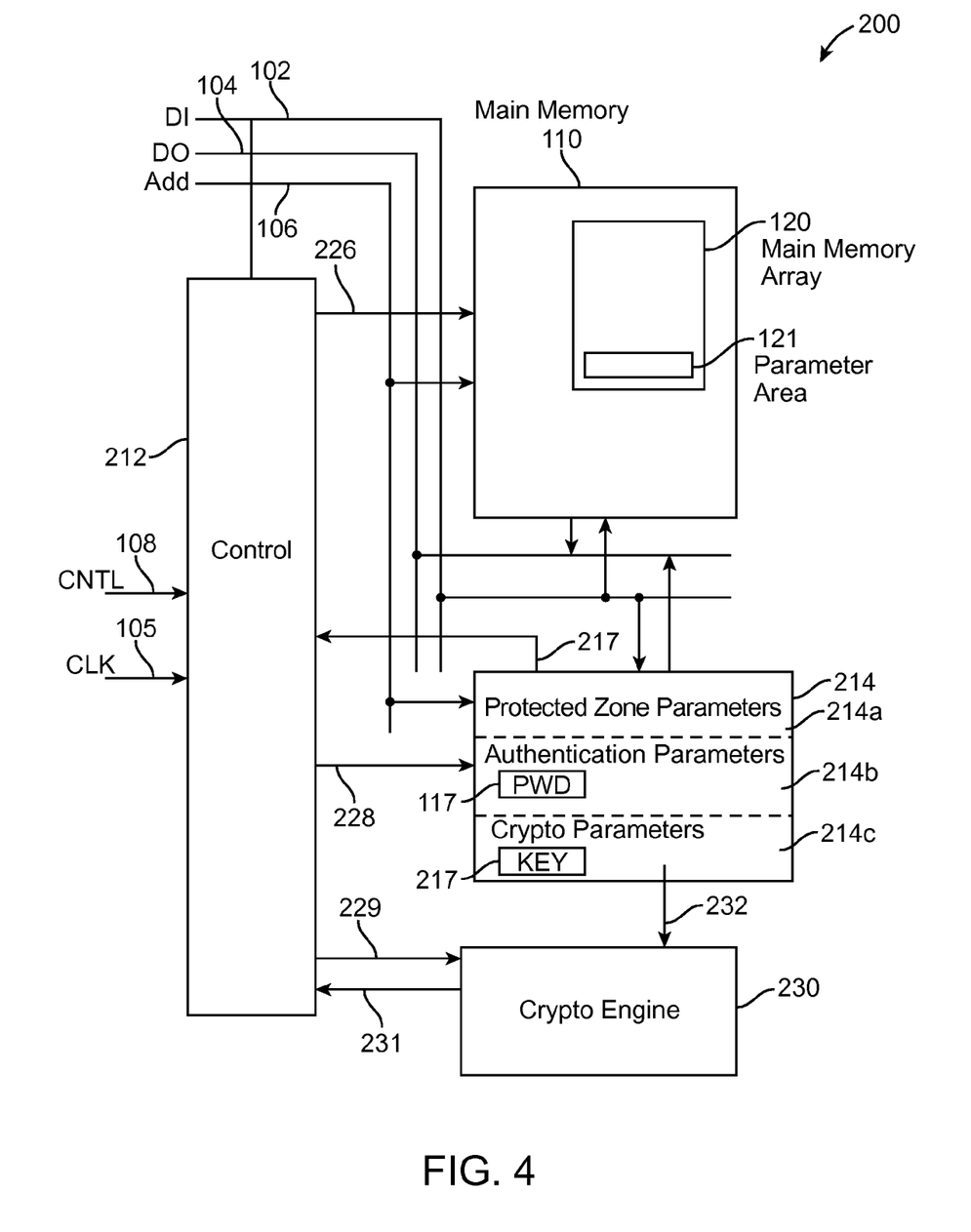
FIG. 4 shows a block diagram of magnetic memory device 200, in accordance with another embodiment of the invention.

FIG. 4 shows a block diagram of magnetic memory device 200, in accordance with another embodiment of the invention. The device 200 is analogous to the device 100 with the addition of crypto engine 230 and crypto parameters in parameter memory 214c the crypto parameters including key 217 for decryption. Similar to the other parameters, the crypto parameters are initialized during power up or when an initialization command is issued after power up. The crypto parameters are provided via bus 232 to crypto engine. The control 212 provides command and control to crypto engine via bus 229 and receives results and status from the crypto engine via bus 231. In the embodiment 200, the password provided along with the PWD CMD to verify and authenticate the user and allow subsequent writes to parameter area, is encrypted. In response to PWD CMD the control 212 generates the command and control to crypto engine 230 via bus 229 to decrypt the encrypted password, and in response the crypto engine 230 provides status indicating completion of decryption along with result of decryption via bus 231 to control circuit 212. The control circuit 212 performs comparison of decrypted result with the password used for authentication to determine if the password is correct.

Figure 5:
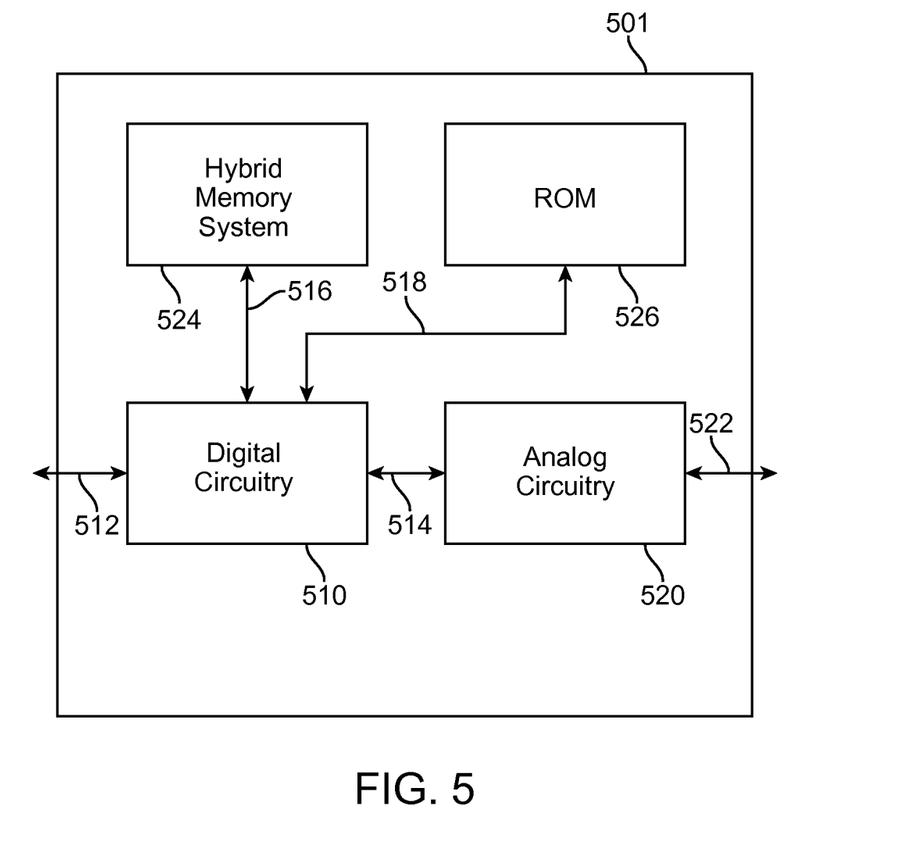
FIG. 5 shows a block diagram of an apparatus 501 incorporating a hybrid memory system 524, which, in some embodiments, includes a combination of magnetic memory, analogous to the magnetic memory device 100 or 200, and volatile memory (such as static random access memory (SRAM) or dynamic random access memory (DRAM)), and in other embodiments includes magnetic memory, in its entirety.

FIG. 5 shows a block diagram of an apparatus 501 incorporating a hybrid memory system 524, which, in some embodiments, includes a combination of magnetic memory, analogous to the magnetic memory device 100 or 200, and volatile memory (such as static random access memory (SRAM) or dynamic random access memory (DRAM)), and in other embodiments includes magnetic memory, in its entirety. The apparatus 501, which is understood as being an exemplary application with many others being contemplated, is shown to include a digital circuitry 510, comprising a microprocessor (microprocessor optionally including instruction cache (I-cache) and data cache (D-cache) coupled to the system 524, and a ROM 526 and an analog circuitry 520 (comprising power on reset generator, low power voltage detect, and a voltage regulator). Additionally the analog circuitry 520 transmits and receives analog data 522 and converts the analog data to digital form for use by the digital circuitry 510 through the digital data 514. The memory 524 receives digital circuitry output 516 from the digital circuitry 510. The ROM 526 is yet another form of memory used to store data during manufacturing of the apparatus 501 and whose contents are read through the signals 518. The system 524 communicates data through the signals 516 to and from the digital circuitry 510. The apparatus 501 transmits and receives information through the interface 512, and the analog data 522. The system 501 optionally includes a non-volatile block access memory such as NAND Flash (not shown) coupled to digital circuit 510 (not shown) for mass storage applications. In some embodiments, the digital circuitry 510 is a microprocessor although other digital circuitry in addition thereto or in replacement thereof is contemplated. The system 501 does not require non-volatile random access NOR Flash as the magnetic memory in the hybrid memory system 524 provides the functionality.

The apparatus 501 allows direct access to the magnetic memory of the hybrid memory 524, and allows processing of microprocessor instructions from the magnetic memory.

Further, the digital circuitry 510, ROM 526, and the analog circuitry 520 may be formed on a single integrated circuit (ICs) or span multiple ICs or partially formed on one or more ICs and partially formed externally to the ICs.

In alternative embodiments, the digital circuitry 510, ROM 526, the analog circuitry 520 and the hybrid memory 524 may be formed on a single integrated circuit (ICs) or span multiple ICs or partially formed on one or more ICs and partially formed externally to the ICs.

Figure 6:
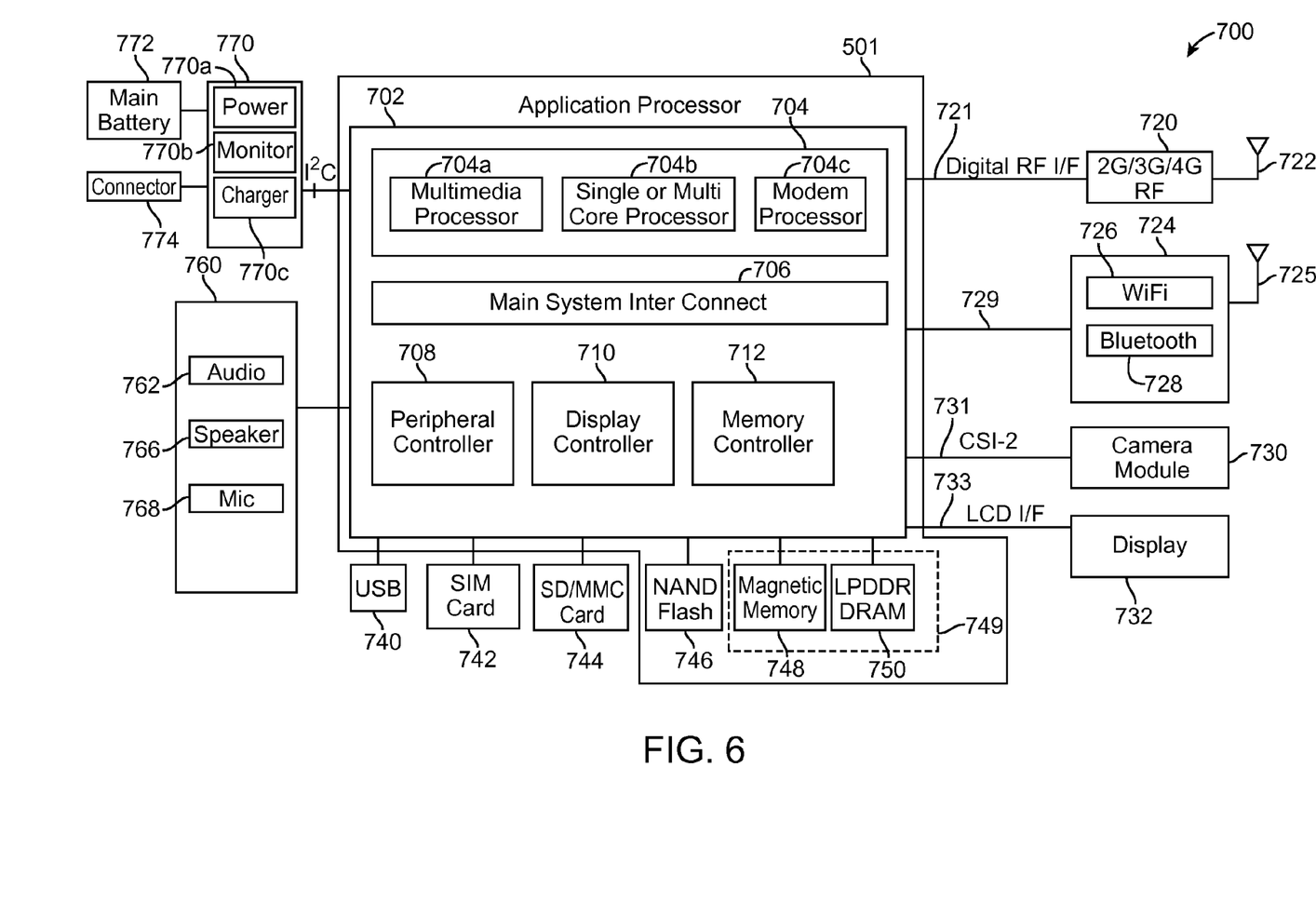
FIG. 6 shows a mobile device incorporating the magnetic memory of the various embodiments of the invention.

FIG. 6 shows a mobile device 700, or a tablet computing device, incorporating various embodiments of FIGS. 1-5, in accordance with an embodiment of the invention. Moreover, those skilled in the art will appreciate that the invention may be practiced in other computer system configurations, including laptops and desktop personal computers. The mobile device 700 is merely one of many examples of the use of the embodiments of FIGS. 1-5.

With reference to FIG. 6, the mobile device 700 is shown to include an application processor 702 coupled to various system components. The application processor 702 is used for all general purpose and specific purpose processing for system 700 which includes a processor cluster 704, a main system interconnect 706 that couples various system components to the processor cluster 704, a memory controller 712, a display controller 710, a peripheral controller 708. The processor cluster 704 includes a single or multi-core processor 704b and optionally a multi-media processor 704a, and a modem processor 704c. The single or multi core processor 704b is used for general purpose processing of instructions and data. The optional multi-media processor is for accelerating 2-D, 3-D graphics, image and video processing. The modem processor is used for digital processing of the digital RF 721. The mobile device 700 includes magnetic memory device 748 similar to magnetic memory device 100 or 200 of the various embodiments of the invention. The mobile device 700 includes DRAM 750 with Low Power Double Data Rate (LPDDR) or LPDDR2 interface coupled to the application processor.

The mobile device 700 optionally includes a non-volatile block access memory such as NAND Flash 746 coupled to application processor 702 for mass storage applications. The mobile device 700 is shown to include a number of external input/output devices shown coupled to the application processor 702. The mobile device 700 is further shown to include a RF modem 720 coupled to the application processor via digital RF interface 721 for connection to cellular networks, such cellular networks including 2G/3G/4G or Long Term Evolution (LTE) network. The cellular network further provides Internet access services. The RF modem 720 is coupled to antenna 722. Other devices in mobile device 700 include a Global Positioning System (GPS) device coupled to the application processor 702 (not shown) for location discovery. The mobile device 700 may further include a Subscriber Identity Module (SIM) card 742 for storing cellular network subscriber information.

The mobile device 700 further includes a wireless device 724 coupled to the application processor 702 via interface 729 for connection to wireless networks for wireless connection to external input and/or output devices or to external computer systems, such networks including WiFi and Bluetooth. The wireless device 724 is coupled to antenna 725 and includes a WiFi 726 controller and a Bluetooth 728 controller. The user interface in mobile device 700 includes display 732 such as a touch-sensitive display screen or Liquid Crystal Display. The user interface in mobile device 700 further includes logical keyboard (not shown) for inputting data, and a number of physical buttons and/or touch screen buttons to facilitate user operations of device (not shown). Other user interfaces in mobile device 700 includes an audio device 760 shown coupled to the application processor 702, the 760 is shown to include audio input/output 762 for connecting to an external audio system, such external audio system may include a headset including a microphone. Speaker 766 is an output audio device, microphone 768 is an input device, and other types of audio devices.

The mobile device 700 includes power manager device 770 for providing power from a battery, monitoring the battery charge, and charging the battery from external power source. The system 700 includes an indicator of battery charge and another indicator that the battery charging is ongoing. Further shown coupled to the power manager 770 are main battery 772 and connector 774 for connecting to an AC power supply for charging the battery and/or operating the mobile device 700. Connector 774 may have USB or mini/micro USB interface.

The mobile device 700 may further include one or more camera modules 730 coupled to the application processor 702 via CSI-2 interface 731. Each camera module includes a sensor, and lenses. The camera module 730 is for capturing images and videos. The mobile device 700 may further include an accelerometer sensor coupled to the application processor 702 via serial peripheral interface (SPI) (not shown). The accelerometer sensor is for detecting the orientation of the mobile device 700 and adjusting the content to suit the orientation.

The mobile device 700 may include ports, slots or interfaces for connection to other external input or output devices coupled to the application processor 702. Such ports and/or interfaces may include USB 740 port, Serial port, Parallel port (not shown), a High Definition Multi-Media Interface (HDMI) (not shown) for connection to a multi-media device, SD, microSD or MMC card 744 through a connection port (e.g. slot) coupled to the application processor 702 for connecting to a standard flash memory card, a micro and/or mini Serial Advanced Attached (mSATA) port coupled to the application processor 702 for connection to external mass storage (not shown).

In order to reduce the number of input/output ports coupled to the application processor 702, the mobile device 700 includes a single general purpose connector for connection to other external user interface input or output devices coupled to the application processor 702. Such connector includes the USB 740 port, connector 774 for connection to an AC power source, High Definition Multi-Media (HDMI) port. Other single general purpose connectors with other interfaces may be apparent to one skill in the art.

In fact, the application processor 702 and the NAND flash 746, the magnetic memory 748, and the LPDDR DRAM 750, in an exemplary embodiment, comprise the system 501 of FIG. 5 with the hybrid memory system 524 being made up of the magnetic memory 748 and optionally LPDDR DRAM 750 and the application processor 702 comprising the remainder of the system 501. The devices shown and discussed herein that are located externally to the application processor 702 and coupled thereto via interfaces that comprise the analog 522 or the interface 512, of FIG. 5, as the case may be. In another exemplary embodiment the application processor 702, the magnetic memory 748, the LPDDR DRAM 750, the NAND flash 746, front-end modem 720, and wireless controller 724 comprise the system 501 of FIG. 5. Other embodiments of system 501 in the mobile device 700 will no doubt become apparent to those skilled in the art.

Further, system 501 in the mobile device 700 may be formed on a single integrated circuit (ICs) or span multiple ICs or partially formed on one or more ICs and partially formed externally to the ICs.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

The invention claimed is:

1. A mobile device comprising:
    an application processor;
    an radio frequency (RF) modem for connection to cellular networks;
    wireless device for connection to wireless networks;
    a display coupled to the application processor;
    audio devices coupled to the application processor;
    power management for providing power through a battery; and
    a hybrid memory system including more than one type of memory, a type of memory of the hybrid memory system including a magnetic memory with a parameter area, the parameter area configured to store parameters used to authenticate access to certain areas of the magnetic memory and
    parameter memory configured to maintain a first area and used to store protected zone parameters, the parameter memory further configured to maintain a second area used to store authentication parameters including an authentication password (PWD), the parameter memory further configured to maintain a third area used to store crypto parameters, the crypto parameters including a key used to decrypt a received encrypted PWD, the encrypted PWD being employed to authorize access to the protected area by a user by decryption of the encrypted PWD using the key and comparison of the decrypted PWD with the authentication PWD, wherein upon a user updating a parameter of the parameter memory, a corresponding parameter of the parameter area is also updated.

2. The mobile device of claim 1, wherein the application processor processes instructions directly from the magnetic memory.

3. The mobile device of claim 2, wherein the parameter memory is a volatile parameter memory and wherein the parameter memory is initialized from parameter area upon power up or initialization command.

4. The mobile device of claim 2, wherein the certain areas in the magnetic memory is made of a plurality of protected zones, each of the protected zones being identified by a starting address and an end address.

5. The mobile device of claim 2, wherein the magnetic memory is organized into a plurality of pages and the parameter memory includes write protection flag bits with each write protection flag bit indicative of the write protection status of a corresponding page of the plurality of pages.

6. The mobile device of claim 2, further including an interface for receiving commands, the commands including a password (PWD) command that includes the encrypted PWD, the PWD command for authenticating, immediately following commands to write to the parameter memory.

7. The mobile device of claim 6, further including a control circuit used to authenticate the encrypted PWD provided by the PWD command 8. The mobile device of claim 7, wherein the control circuit is operable to execute commands to write to the parameter memory if authentication of the encrypted PWD is successful.

9. The mobile device of claim 7, wherein the control circuit is operable to inhibit commands to write to the parameter memory if authentication of the encrypted PWD fails.

10. The mobile device of claim 7, further including a crypto engine coupled to the control circuit and the parameter memory.

11. The mobile device of claim 10, wherein the encrypted PWD, upon decryption, is used to authenticate subsequent commands to write to the parameter memory.

12. The mobile device of claim 11, wherein upon failure to authenticate, write of subsequent commands to parameter memory is inhibited.

13. The mobile device of claim 2, wherein the hybrid memory includes a volatile memory.

14. The mobile device of claim 13, further including a non-volatile block storage.

15. The mobile device of claim 14, wherein the non-volatile block storage is comprised of NAND flash memory.

16. The mobile device of claim 15, further including one or more interfaces for connection to other external input or output devices coupled to the application processor.

17. The mobile device of claim 16, further including a keyboard.

18. The mobile device of claim 16, where in the display is a touch screen display.

19. The mobile device of claim 16, wherein the application processor processes instructions directly from the magnetic memory.

20. The mobile device of claim 16, wherein the parameter memory is a volatile parameter memory and wherein the parameter memory is initialized from parameter area upon power up or initialization command.

21. The mobile device of claim 16, wherein the certain areas in the magnetic memory is made of a plurality of protected zones, each of the protected zones being identified by a starting address and an end address.

22. The mobile device of claim 16, wherein the magnetic memory is organized into a plurality of pages and the parameter memory includes write protection flag bits with each write protection flag bit indicative of the write protection status of a corresponding page of the plurality of pages.

23. The mobile device of claim 7, wherein the control circuit is operable to execute commands to write to the parameter memory if authentication is successful.

24. The mobile device of claim 7, wherein the control circuit is operable to inhibit commands to write to the parameter memory if authentication fails.

25. The mobile device of claim 7, further including a crypto engine coupled to the control circuit.

26. The mobile device of claim 1, wherein the decrypted PWD is used to authenticate subsequent commands to write to the parameter memory.

27. The mobile device of claim 26, wherein upon failure to authenticate, write of subsequent commands to parameter memory is inhibited.

28. The mobile device of claim 1, further including a connection port for coupling the mobile device to a mass storage.

29. The mobile device of claim 1, further including a multimedia device (MMC), secure digital (SD), or microSD port for coupling the mobile device to a standard flash memory card.

30. The mobile device of claim 29, wherein the port is coupled to the application processor.

31. The mobile device of claim 1, wherein the magnetic memory is spin torque transfer magnetic random access memory (STTMRAM).

32. The mobile device of claim 1, wherein the parameter memory includes parameter non-volatile memory and parameter volatile memory, and further wherein, the protected zone parameters are stored in the volatile memory and the authentication parameter are stored in the non-volatile memory.

33. The mobile device of claim 32, wherein the parameter non-volatile memory is magnetic memory.

34. The mobile device of claim 32, wherein the magnetic memory of the parameter non-volatile memory is spin torque transfer magnetic random access memory (STTMRAM).

35. The mobile device of claim 1, wherein the hybrid memory system includes volatile memory.

* * * * *